United States Patent
Wang et al.

(10) Patent No.: US 11,084,919 B2
(45) Date of Patent: Aug. 10, 2021

(54) SOFT AND TRANSPARENT POLYPROPYLENE COMPOSITION

(71) Applicant: BOREALIS AG, Vienna (AT)

(72) Inventors: Jingbo Wang, Engerwitzdorf (AT); Friedrich Berger, Linz (AT); Petar Doshev, Linz (AT); Manfred Gruenberger, Linz (AT); Martina Sandholzer, Linz (AT); Markus Gahleitner, Neuhofen/Krems (AT)

(73) Assignee: BOREALIS AG, Vienna (AT)

( * ) Notice: Subject to any disclaimer, the term of this patent is extended or adjusted under 35 U.S.C. 154(b) by 207 days.

(21) Appl. No.: 16/310,036

(22) PCT Filed: Jun. 26, 2017

(86) PCT No.: PCT/EP2017/065684
§ 371 (c)(1),
(2) Date: Dec. 14, 2018

(87) PCT Pub. No.: WO2018/001949
PCT Pub. Date: Jan. 4, 2018

(65) Prior Publication Data
US 2019/0330459 A1  Oct. 31, 2019

(30) Foreign Application Priority Data
Jun. 28, 2016 (EP) .................... 16176618

(51) Int. Cl.
C08L 23/12 (2006.01)
C08F 210/16 (2006.01)
C08L 23/16 (2006.01)

(52) U.S. Cl.
CPC ............ C08L 23/12 (2013.01); C08F 210/16 (2013.01); C08L 23/16 (2013.01); C08L 2201/10 (2013.01);
(Continued)

(58) Field of Classification Search
None
See application file for complete search history.

(56) References Cited

U.S. PATENT DOCUMENTS 7,872,074 B2  1/2011  Massari et al.
9,181,423 B2  11/2015  Kock et al.
(Continued)

FOREIGN PATENT DOCUMENTS

CN   103080212 A   5/2013
EP   0887379 A1   12/1988
(Continued)

OTHER PUBLICATIONS

Office action for India Patent Application No. 201817044715, dated Dec. 26, 2019.
(Continued)

Primary Examiner — Rachel Kahn
Assistant Examiner — Ha S Nguyen
(74) Attorney, Agent, or Firm — Tarolli, Sundheim, Covell & Tummino LLP

(57) ABSTRACT

The present invention is directed to a polypropylene composition (C) comprising a heterophasic propylene copolymer (RAHECO) and a propylene homopolymer (H-PP) as well as a process for the preparation of said polypropylene composition and a film obtained from said polypropylene composition (C).

14 Claims, 3 Drawing Sheets

Effect of total C2 content on melting point Tm of inventive and comparative examples

(52) U.S. Cl.
CPC ....... *C08L 2203/16* (2013.01); *C08L 2205/03* (2013.01); *C08L 2207/02* (2013.01)

(56) References Cited

U.S. PATENT DOCUMENTS

| | | |
|---|---|---|
| 2015/0307222 A1 | 10/2015 | Bernreitner et al. |
| 2017/0066912 A1* | 3/2017 | Wang ............... C08L 23/142 |

FOREIGN PATENT DOCUMENTS

| | | | |
|---|---|---|---|
| EP | 2423257 | 2/2012 | |
| EP | 2546298 A1 | 1/2013 | |
| EP | 2557118 A1 | 2/2013 | |
| EP | 2586823 A1 | 5/2013 | |
| EP | 2610271 A1 | 7/2013 | |
| EP | 2610272 A1 | 7/2013 | |
| EP | 2610273 A1 | 7/2013 | |
| WO | 92/12182 A1 | 7/1992 | |
| WO | 99/24478 A1 | 5/1999 | |
| WO | 99/24479 A1 | 5/1999 | |
| WO | 00/68315 A1 | 11/2000 | |
| WO | 2004/000899 A1 | 12/2003 | |
| WO | 2004/111095 A1 | 12/2004 | |
| WO | 2012/007430 A1 | 1/2012 | |
| WO | 2012/025584 A1 | 3/2012 | |
| WO | 2013/010879 A1 | 1/2013 | |
| WO | WO-2013079457 A1 * | 6/2013 | ............ C08L 23/04 |
| WO | 2013/160203 A1 | 10/2013 | |
| WO | 2014/090818 A1 | 6/2014 | |
| WO | 2014/187686 A1 | 11/2014 | |
| WO | 2015/024891 A1 | 2/2015 | |
| WO | 2015/075054 A1 | 5/2015 | |
| WO | WO-2015139875 A1 * | 9/2015 | ............ C08L 23/142 |
| WO | 2016/066446 A1 | 5/2016 | |

OTHER PUBLICATIONS

Zweifel, et al., "Plastics Additives Handbook", 6th Edition, Department of Materials, Institute of Polymers, 2008.
Zhou et al., "A new decoupling method for accurate quantification of polyethylene copolymer composition and triad sequence distribution with 13C NMR", Journal of Magnetic Resonance 187 (2007) pp. 225-233.
Wang et al., "Structural Analysis of Ethylene/Propylene Copolymers Synthesized with a Constrained Geometry Catalyst", Macromolecules 2000, 33, pp. 1157-1162.
Singh et al., "Triad sequence determination of ethylene-propylene copolymers—application of quantitative 13C NMR", Polymer Testing 28 (2009) pp. 475-479.
Resconi et al., "Selectivity in Propene Polymerization with Metallocene Catalysts", Chem. Rev. 2000, 100, pp. 1253-1345.
Kakugo et al., "13C NMR Determination of Monomer Sequence Distribution in Ethylene-Propylene Copolymers Prepared with d-TiC13-Al(C2H5)2C1" Macromolecules 1982, 15, pp. 1150-1152.
H.N. Cheng, "13C NMR Analysis of Ethylene-Propylene Rubbers", Macromolecules 1984, 17, 1950-1955.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
Busico, et al., "Full Assignment of the 13C NMR Spectra of Regioregular Polypropylenes: Methyl and Methylene Region", Macromolecules 1997, 30, pp. 6251-6263.
Busico, et al., "Microstructure of polypropylene", Prog. Polym. Sci. 26 (2001), pp. 443-533.
Sacchi, et al., "Polymerization Stereochemistry with Ziegler-Natta Catalysts Containing Dialkylpropane Diethers: A Tool for Understanding Internal/External Donor Relationships", Macromolecules 1996, 29, 3341-3345.
Macromolecules, Aspects of Plastic Additives Related to Health, Safety and Environment, 1991, 6823-6826.
European Search Report for Application 16176618.3-1302, dated Sep. 30, 2016.
Chinese Office Action dated Sep. 28, 2020.
Article 94(3) dated Feb. 18, 2020.

* cited by examiner

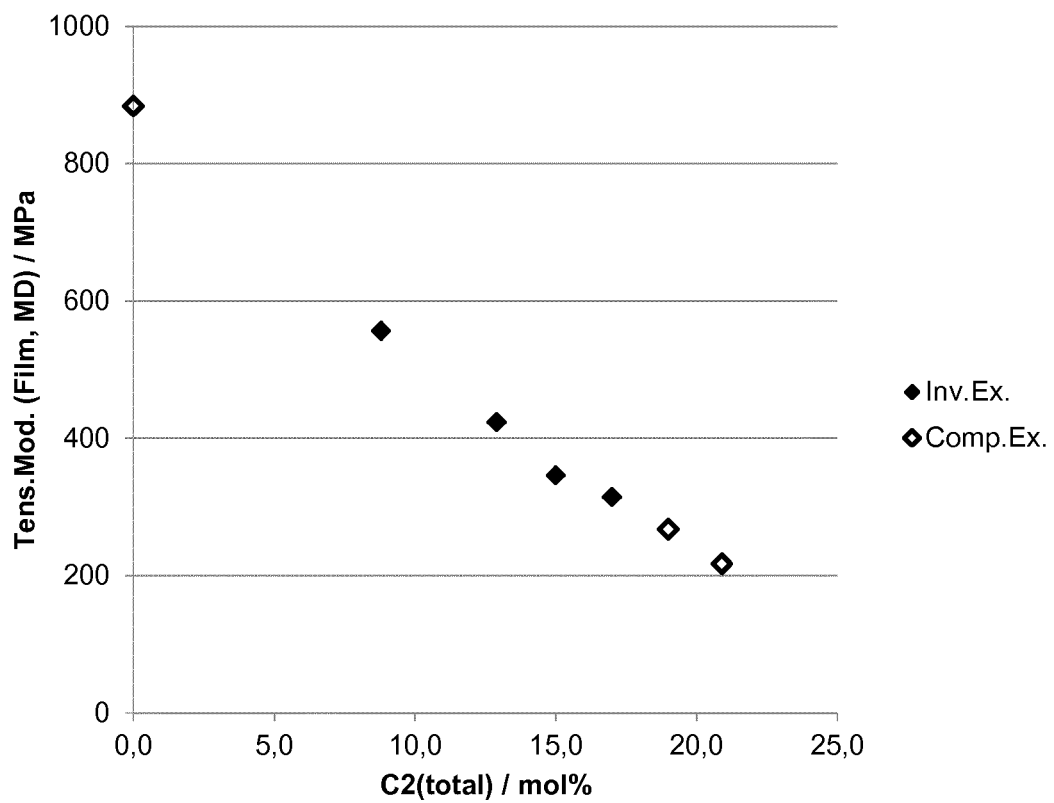
Fig. 1: Effect of total C2 content on melting point Tm of inventive and comparative examples

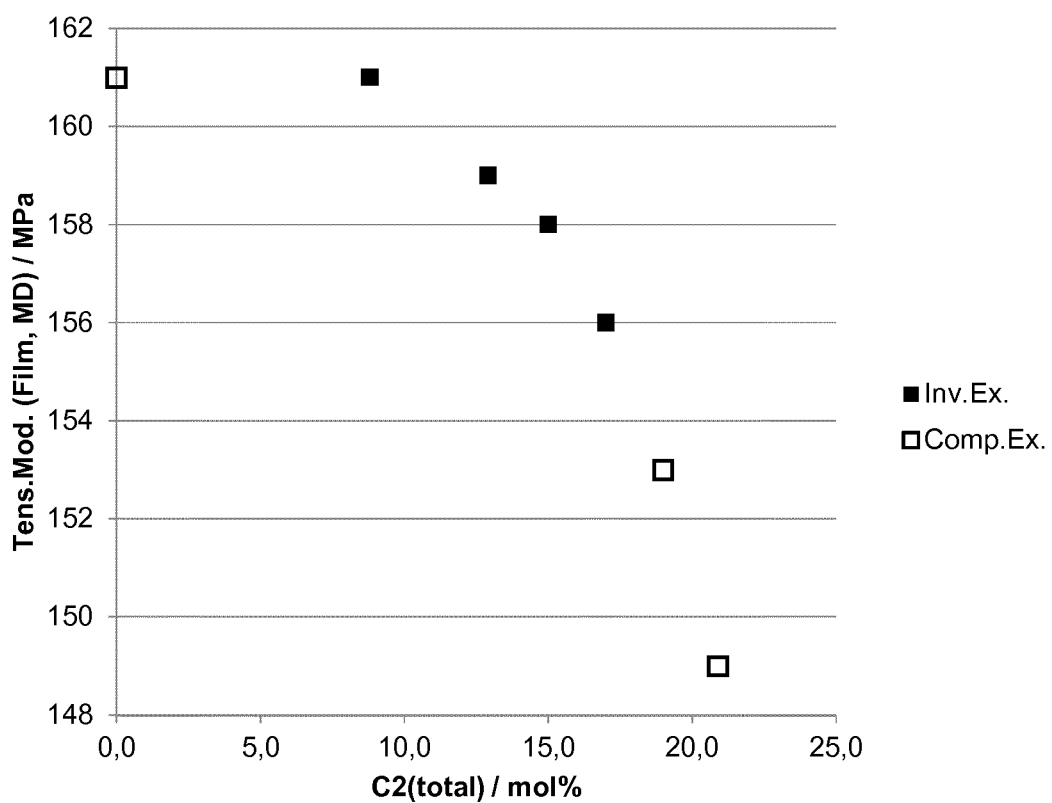
Fig. 2: Effect of total C2 content on film modulus of inventive and comparative examples

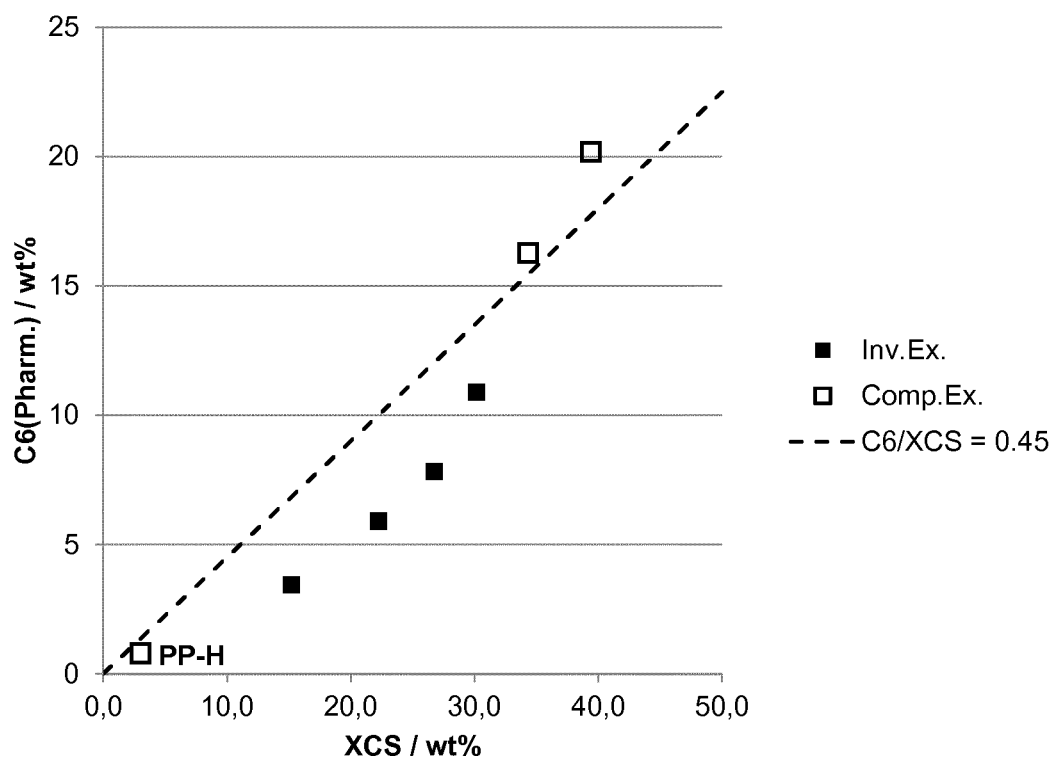
Fig. 3: Relation between the hexane soluble content C6 and the xylene soluble content XCS for inventive and comparative examples

SOFT AND TRANSPARENT POLYPROPYLENE COMPOSITION

The present invention is directed to a polypropylene composition (C) comprising a heterophasic propylene copolymer (RAHECO) and a propylene homopolymer (H-PP) as well as a process for the preparation of said polypropylene composition and a film obtained from said polypropylene composition (C).

Polyolefin compositions with high sterilization resistance and films comprising said compositions are gaining more and more interest, particularly in the field of packaging materials for medicals and food. The requirements for such films are high transparency, i.e. low haze, and high impact resistance. It is desirable that both properties are maintained after a step of heat sterilization which is, however, difficult to achieve for both properties together. By "sterilization resistance", a minimization of both the loss of transparency and the impact resistance after heat sterilization is meant. A further requirement for modern packaging applications for medicals and food is a certain softness of the material, meaning that the modulus should be as low as possible. The currently existing solution, i.e. heterophasic propylene copolymers (HECOs) or soft polypropylenes, are more or less suffering some challenges in one or the other respect.

Therefore, a new solution is required. Moreover, the leachables content of the final composition is a topic if the crystallinity of the composition is too low.

Accordingly, it is an object of the present application to provide a polypropylene composition (C) comprising a heterophasic system with an optimized or improved balance between softness and optical properties.

The finding of the present invention is to provide a polypropylene composition (C) comprising a heterophasic propylene copolymer (RAHECO) and a propylene homopolymer (H-PP).

Accordingly, the present invention is directed to a polypropylene composition (C),
a) a matrix (M) comprising a random propylene copolymer (R-PP) and a propylene homopolymer (H-PP) and
b) an elastomeric propylene copolymer (E) dispersed in said matrix (M),
wherein said polypropylene composition (C) has
i) an intrinsic viscosity (IV) determined according to DIN ISO 1628/1 (in Decalin at 135° C.) of the xylene soluble fraction (XCS) of at least 1.8 dl/g,
ii) a comonomer content of the xylene soluble fraction (XCS) of at least 30.0 mol-%, and
iii) a melt flow rate $MFR_2$ (230° C.) measured according to ISO 1133 of at least 2.0 g/10 min.

In one embodiment of the present invention, the polypropylene composition (C) has a melting temperature Tm above 153° C.

In a further embodiment of the present invention, the polypropylene composition (C) has
i) a xylene soluble content (XCS) in the range of 10.0 to 45.0 wt.-%, and/or
ii) an ethylene content in the range of 5.0 to 25.0 mol-%, and/or
iii) a hexane soluble content in the range of 2.0 to below 16.0 wt.-%.

In another embodiment of the present invention, the ratio between the hexane soluble content C6 and the xylene soluble content XCS (C6/XCS) of the inventive polypropylene composition (C) is below 0.45.

In one embodiment of the present invention, the polypropylene composition (C) has
i) a haze before sterilization measured according to ASTM D 1300-00 on a 100 μm thick film below 20.0% and/or
ii) a haze after sterilization measured according to ASTM D 1300-00 on a 100 μm thick film below 12.0%.

It is especially preferred that the difference between the haze after sterilization and the haze before sterilization measured according to ASTM D 1300-00 on a 100 μm thick film is below 4.0%.

In another embodiment of the present invention, the polypropylene composition (C) comprises
i) 75 to 95 wt.-% of the matrix (M) and
ii) 5 to 25 wt.-% of the elastomeric propylene copolymer (E),
based on the overall weight of the polypropylene composition (C),
and/or
i) 30 to 75 wt.-% of the random propylene copolymer (R-PP),
ii) 15 to 70 wt.-% of the propylene homopolymer (H-PP) and
iii) 5 to 25 wt.-% of the elastomeric propylene copolymer (E),
based on the overall weight of the polypropylene composition (C).

In a further embodiment of the present invention, the comonomers of the random propylene copolymer (R-PP) and/or the comonomers of the elastomeric propylene copolymer (E) are ethylene and/or C4 to C8 α-olefins.

In still another embodiment of the present invention, the random propylene copolymer (R-PP) and the elastomeric propylene copolymer (E) form a heterophasic propylene copolymer (RAHECO), said heterophasic propylene copolymer (RAHECO) having
a) a melt flow rate $MFR_2$ (230° C.) measured according to ISO 1133 in the range of 0.1 to 10.0 g/10 min, and/or
b) a xylene soluble content (XCS) in the range of 20.0 to 60.0 wt.-%, and/or
c) a comonomer content in the range of 5.0 to 35.0 mol-%.

It is especially preferred that the heterophasic propylene copolymer (RAHECO) comprises
i) 60 to 90 wt.-% of the random propylene copolymer (R-PP) and
ii) 10 to 40 wt.-% of the elastomeric propylene copolymer, based on the overall weight of the heterophasic propylene copolymer (RAHECO).

In one embodiment of the present invention, the propylene homopolymer (H-PP) has a melt flow rate MFR (230° C.) measured according to ISO 1133 in the range of 0.1 to 15.0 g/10 min.

The present invention is further directed to a film comprising the polypropylene composition (C) as described above.

The present invention is also directed to a process for producing the polypropylene composition (C) as described above, comprising the steps of
a) providing a propylene homopolymer (H-PP),
b) polymerizing in a first reactor (R1) propylene and ethylene and/or a C4 to C8 α-olefin, obtaining a first random propylene copolymer fraction (R-PP1),
c) transferring the first random propylene copolymer fraction (R-PP1) into a second reactor (R2),
d) polymerizing in said second reactor (R2) in the presence of the first random propylene copolymer fraction (R-PP1) propylene and ethylene and/or a C4 to C8 α-olefin, obtaining a second random copolymer fraction (R-PP2), said first random propylene copolymer fraction (R-PP1) and said second random copolymer fraction (R-PP2) forming the random propylene copolymer (R-PP), e) transferring said random propylene copolymer (R-PP) into a third reactor (R3), f) polymerizing in said third reactor (R3) in the presence of the random propylene copolymer (R-PP) propylene and/or a C4 to C8 α-olefin, obtaining a third polymer fraction, said polymer fraction is the elastomeric copolymer (E), said propylene copolymer (R-PP) and said elastomeric propylene copolymer (E) form the heterophasic propylene copolymer (RAHECO), g) melt blending the heterophasic propylene copolymer (RAHECO) obtained in step f) with the propylene homopolymer (H-PP) of step a).

It is especially preferred that the first random propylene copolymer fraction (R-PP1), the random propylene copolymer (R-PP) and the elastomeric copolymer (E) have been polymerized in the presence of a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound, preferably is a non-phthalic acid ester;

b) optionally a co-catalyst (Co), and c) optionally an external donor (ED).

In the following, the present invention is described in more detail.

BRIEF DESCRIPTION OF THE DRAWINGS

FIG. 1 illustrates the effect of total C2 content on melting point Tm of inventive and comparative examples.

FIG. 2 illustrates the effect of total C2 content on film modulus of inventive and comparative examples.

FIG. 3 illustrates the relation between the hexane soluble content C6 and the xylene soluble content XCS for inventive and comparative examples.

The Composition (C)

The inventive polypropylene composition (C) is especially featured by its specific optical and mechanical properties.

Accordingly, it is preferred that the polypropylene composition (C) has a flexural modulus measured on injection moulded specimens according to ISO 178 in the range of 400 to 1200 MPa, preferably in the range of 450 to 1150 MPa, like in the range of 500 to 1100 MPa.

Further, it is preferred that the polypropylene composition (C) has a tensile modulus measured on 100 μm cast films in machine direction according to ISO 527-2 below 600 MPa, more preferably below 580 MPa, still more preferably below 560 MPa. A reasonable lower limit for said tensile modulus is 250 MPa.

With regard to the optical properties, it is preferred that the polypropylene composition (C) has a haze before sterilization according to ASTM D 1003-00 measured on a 100 μm thick film below 20.0%, more preferably below 18.0%, still more preferably at most 16.0%.

Furthermore, it is preferred that the polypropylene composition (C) has a haze after sterilization according to ASTM D 1003-00 measured on a 100 μm thick film below 12.0%, more preferably below 11.5%, still more preferably at most 10.0%.

Additionally or alternatively to the previous paragraphs, the difference between the haze after sterilization and the haze before sterilization measured according to ASTM D 1300-00 on a 100 μm thick film is below 4.0%, more preferably below 2.0%, still more preferably below 1.9%. Said difference can also reach negative values.

The polypropylene composition (C) according to this invention is featured by a moderate melt flow rate. Accordingly, the polypropylene composition (C) has a melt flow rate $MFR_2$ (230° C./2.16 kg) measured according to ISO 1133 of at least 2.0 g/10 min, preferably in the range of 2.0 to 20.0 g/10 min, more preferably in the range of 2.5 to 15.0 g/10 min, still more preferably in the range of 3.0 to 10.0 g/10 min.

Preferably, the polypropylene composition (C) has a xylene soluble content (XCS) in the range of 10.0 to 45.0 wt.-%, more preferably in the range of 12.0 to 35.0 wt.-%, still more preferably in the range of 14.0 to 32.0 wt.-%.

Preferably, the polypropylene composition (C) has an ethylene content of the xylene soluble fraction (XCS) of the polypropylene composition (C) of at least 30.0 mol-%, more preferably in the range of 30.0 to 45.0 mol-%, still more preferably in the range of 31.0 to 40.0 mol-%, still more preferably in the range of 32.0 to 37.0 mol-%.

Further, it is preferred that the polypropylene composition (C) has an intrinsic viscosity (IV) determined according to DIN ISO 1628/1 (in Decalin at 135° C.) of the xylene soluble fraction (XCS) of at least 1.8 dl/g, more preferably in the range of 1.8 to 3.0 dl/g, still more preferably in the range of 2.0 to 2.6 dl/g.

Additionally, it is preferred that the intrinsic viscosity (IV) of the polypropylene composition (C) determined according to DIN ISO 1628/1 (in Decalin at 135° C.) of the xylene insoluble fraction (XCI) is in the range of 1.5 to 4.0 dl/g, more preferably in the range of 2.0 to 3.5 dl/g, still more preferably in the range of 2.5 to 3.2 dl/g.

Further, it is preferred that the polypropylene composition (C) has a comonomer content of the xylene insoluble fraction (XCI) is in the range of 1.0 to 8.5 mol-%, more preferably in the range of 2.5 to 7.2 mol-%, still more preferably in the range of 2.8 to 6.7 mol-%.

The polypropylene composition (C) according to the present invention is also featured by a rather low amount of hexane solubles. Accordingly, the polypropylene composition (C) preferably has a hexane soluble content in the range of 2.0 to below 16.0 wt.-%, more preferably in the range of 3.0 to 13.0 wt.-%, still more preferably in the range of 3.3 to 11.5 wt.-%.

Additionally to the previous paragraph, it is preferred that the ratio between the hexane soluble content C6 and the xylene soluble content XCS (C6/XCS) of the inventive polypropylene composition is below 0.45, more preferably below 0.40, still more preferably below 0.38.

Preferably, it is desired that the polypropylene composition (C) is thermo mechanically stable. Accordingly, it is appreciated that the polypropylene composition (C) has a melting temperature above 150° C., more preferably in the range of 152 to 164° C., still more preferably in the range of 153 to 163° C.

Typically, the polypropylene composition (C) has a rather low crystallization temperature, i.e. of not more than 130° C., more preferably in the range of 110 to 127° C., still more preferably in the range of 115 to 125° C.

The polypropylene composition (C) comprises apart from propylene also comonomers. Preferably the polypropylene composition (C) comprises apart from propylene ethylene and/or C4 to C8 α-olefins. Accordingly, the term "polypropylene composition" according to this invention is understood as a polypropylene comprising, preferably consisting of, units derivable from (a) propylene and
(b) ethylene and/or C4 to C8 α-olefins.

Preferably, the polypropylene composition (C) has an ethylene content in the range of 5.0 to 25.0 mol.-%, more preferably in the range of 6.5 to 20.0 mol.-%, still more preferably in the range of 7.5 to 18.0 mol.-%.

The inventive polypropylene composition (C) is a heterophasic system comprising a random propylene copolymer (R-PP) and a propylene homopolymer (H-PP) forming the matrix (M) and elastomeric propylene copolymer (E) dispersed in said matrix (M). Thus the matrix (M) contains (finely) dispersed inclusions being not part of the matrix (M) and said inclusions contain the elastomeric propylene copolymer (E). The term inclusion indicates that the matrix (M) and the inclusion form different phases as defined below.

It is preferred that the polypropylene composition (C) comprises, more preferably consists of, 75 to 95 wt.-% of the matrix (M), more preferably 80 to 94 wt.-%, still more preferably 82 to 93 wt.-% and 5 to 25 wt.-% of the elastomeric propylene copolymer (E), more preferably 6 to 20 wt.-%, still more preferably 7 to 18 wt.-%, based on the overall weight of the polypropylene composition (C).

As outlined above, the matrix of the polypropylene composition (C) comprises a random propylene copolymer (R-PP) and a propylene homopolymer (H-PP).

In particular, it is preferred that the polypropylene composition (C) comprises, more preferably consists of, 30 to 75 wt.-% of the random propylene copolymer (R-PP), more preferably 31 to 70 wt.-%, still more preferably 32 to 68 wt.-%, and 15 to 70 wt.-% of the propylene homopolymer (H-PP), more preferably 17 to 65 wt.-%, still more preferably 19 to 62 wt.-%, and 5 to 25 wt.-% of the elastomeric propylene copolymer (E), more preferably 6 to 20 wt.-%, still more preferably 7 to 18 wt.-%, based on the overall weight of the polypropylene composition (C).

The polypropylene composition (C) of the present invention may include additives (AD). Accordingly, it is preferred that the polypropylene composition (C) comprises, more preferably consists of, 30 to 75 wt.-% of the random propylene copolymer (R-PP), more preferably 31 to 70 wt.-%, still more preferably 32 to 68 wt.-%, and 15 to 70 wt.-% of the propylene homopolymer (H-PP), more preferably 17 to 65 wt.-%, still more preferably 19 to 62 wt.-%, and 5 to 25 wt.-% of the elastomeric propylene copolymer (E), more preferably 6 to 20 wt.-%, still more preferably 7 to 18 wt.-%, and 0.05 to 5 wt.-%, preferably 0.1 to 3 wt.-% of additives (AD), based on the overall weight of the polypropylene composition (C). The additives (AD) are described in more detail below.

Preferably the polypropylene composition (C) of the invention does not comprise (a) further polymer(s) different to the random propylene copolymer (R-PP), the propylene homopolymer (H-PP) and the elastomeric propylene copolymer (E) in an amount exceeding 5.0 wt.-%, preferably in an amount exceeding 3.0 wt.-%, more preferably in an amount exceeding 2.5 wt.-%, based on the overall weight of the polypropylene composition (C).

Preferably, the polypropylene composition (C) is obtained by a sequential polymerization process wherein at least two, like three, reactors are connected in series. For example, said process comprises the steps of
a) polymerizing propylene in a first reactor (R1) to obtain the propylene homopolymer (H-PP),
b) transferring the propylene homopolymer (H-PP) into a second reactor (R2),
c) polymerizing in said second reactor (R2) in the presence of the propylene homopolymer (H-PP) propylene and ethylene and/or a $C_4$ to $C_8$ α-olefin obtaining the random propylene copolymer (R-PP), said propylene homopolymer (H-PP) and said random propylene copolymer (R-PP) form the matrix (M),
d) transferring the matrix (M) into a third reactor (R3),
e) polymerizing in said third reactor (R3) in the presence of the matrix (M) propylene and/or a $C_4$ to $C_8$ α-olefin, obtaining a third polymer fraction, said polymer fraction is the elastomeric copolymer (E), said matrix (M) and said elastomeric propylene copolymer (E) form the polypropylene composition (C).

Alternatively, the polypropylene composition (C) is obtained by melt blending a heterophasic propylene copolymer (RAHECO) with the propylene homopolymer (H-PP), said heterophasic propylene copolymer (RAHECO) comprising the random propylene copolymer (R-PP) and the elastomeric propylene copolymer (E). Melt blending of said heterophasic propylene copolymer (RAHECO) with the propylene homopolymer (H-PP) results in a heterophasic system wherein the elastomeric propylene copolymer (E) is dispersed within the random copolymer (R-PP) and the propylene homopolymer (H-PP), i.e. a heterophasic system wherein the random copolymer (R-PP) and the propylene homopolymer (H-PP) form the matrix.

It is especially preferred that the polypropylene composition (C) is obtained by melt blending a heterophasic propylene copolymer (RAHECO) as defined above with the propylene homopolymer (H-PP).

In the following, the heterophasic propylene copolymer (RAHECO) and the propylene homopolymer (H-PP) are described in more detail.

The Heterophasic Propylene Copolymer (RAHECO)

The inventive polypropylene composition (C) comprises a heterophasic propylene copolymer (RAHECO).

The heterophasic propylene copolymer (RAHECO) according to this invention comprises a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (RAHECO). The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Preferably, the heterophasic propylene copolymer (RAHECO) according to this invention comprises as polymer components only the random propylene copolymer (R-PP) and the elastomeric propylene copolymer (E). In other words, the heterophasic propylene copolymer (RAHECO) may contain further additives but no other polymer in an amount exceeding 5.0 wt.-%, more preferably exceeding 3.0 wt.-%, like exceeding 1.0 wt.-%, based on the total heterophasic propylene copolymer (RAHECO). One additional polymer which may be present in such low amounts is a polyethylene which is a by-reaction product obtained by the preparation of the heterophasic propylene copolymer (RAHECO). Accordingly, it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

The heterophasic propylene copolymer (RAHECO) applied according to this invention is featured by a rather low melt flow rate. Accordingly, the heterophasic propylene copolymer (RAHECO) has a melt flow rate $MFR_2$ (230° C.) in the range of 0.1 to 10.0 g/10 min, preferably in the range of 0.5 to 6.0 g/10 min, more preferably in the range of 1.0 to 4.0 g/10 min. Preferably the melt flow rate $MFR_2$ (230° C.) indicated in this paragraph is the melt flow rate $MFR_2$ (230° C.) after visbreaking (see below).

Preferably, it is desired that the heterophasic propylene copolymer (RAHECO) is thermo mechanically stable. Accordingly, it is appreciated that the heterophasic propylene copolymer (RAHECO) has a melting temperature of at least 135° C., more preferably in the range of 135 to 160° C., still more preferably in the range of 137 to 155° C.

Typically, the heterophasic propylene copolymer (RAHECO) has a rather low crystallization temperature, i.e. of not more than 125° C., more preferably in the range of 105 to 125° C., still more preferably in the range of 108 to 120° C.

The heterophasic propylene copolymer (RAHECO) comprises apart from propylene also comonomers. Preferably the heterophasic propylene copolymer (RAHECO) comprises apart from propylene ethylene and/or $C_4$ to $C_8$ α-olefins. Accordingly, the term "propylene copolymer" according to this invention is understood as a polypropylene comprising, preferably consisting of, units derivable from
(a) propylene and
(b) ethylene and/or $C_4$ to $C_8$ α-olefins.

Thus, the heterophasic propylene copolymer (RAHECO), i.e. the random propylene copolymer (R-PP) as well as the elastomeric propylene copolymer (E), such as the first elastomeric propylene copolymer fraction (E1) and the second elastomeric propylene copolymer fraction (E2), comprises monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, the heterophasic propylene copolymer (RAHECO) according to this invention comprises, especially consists of, monomers copolymerizable with propylene from the group consisting of ethylene, 1-butene and 1-hexene. More specifically, the heterophasic propylene copolymer (RAHECO) of this invention comprises—apart from propylene—units derivable from ethylene and/or 1-butene. In a preferred embodiment, the heterophasic propylene copolymer (RAHECO) according to this invention comprises units derivable from ethylene and propylene only. Still more preferably the random propylene copolymer (R-PP) as well as the elastomeric propylene copolymer (E), i.e. the first elastomeric propylene copolymer fraction (E1) and the second elastomeric propylene copolymer fraction (E2) of the heterophasic propylene copolymer (RAHECO) contain the same comonomers, like ethylene.

Accordingly, the elastomeric propylene copolymer (E) is preferably an ethylene propylene rubber (EPR), whereas the random propylene copolymer (R-PP) is a random ethylene propylene copolymer (R-PP).

Additionally, it is appreciated that the heterophasic propylene copolymer (RAHECO) preferably has a moderate total comonomer content, preferably ethylene content, which contributes to the softness of the material. Thus, it is preferred that the comonomer content of the heterophasic propylene copolymer (RAHECO) is in the range from 5.0 to 35.0 mol-%, preferably in the range from 11.0 to 28.0 mol-%, more preferably in the range from 15.0 to 24.0 mol-%.

The xylene cold soluble (XCS) fraction measured according to according ISO 16152 (25° C.) of the heterophasic propylene copolymer (RAHECO) is in the range of 20.0 to 60.0 wt.-%, preferably in the range from 30.0 to 55.0 wt.-%, more preferably in the range of 35.0 to 50.0 wt.-%, still more preferably in the range from 37.0 to 45.0 wt.-%.

Further it is appreciated that the xylene cold soluble (XCS) fraction of the heterophasic propylene copolymer (RAHECO) is specified by its intrinsic viscosity. A low intrinsic viscosity (IV) value reflects a low weight average molecular weight. For the present invention it is appreciated that the xylene cold soluble fraction (XCS) of the heterophasic propylene copolymer (RAHECO) has an intrinsic viscosity (IV) measured according to ISO 1628/1 (at 135° C. in decalin) in the range of 1.0 to 3.0 dl/g, preferably in the range of 1.2 to 2.7 dl/g, more preferably in the range of 1.5 to 2.5 dl/g.

Additionally, it is preferred that the comonomer content, i.e. ethylene content, of the xylene cold soluble (XCS) fraction of the heterophasic propylene copolymer (RAHECO) is below 45 mol-%, preferably in the range of 25 to 42 mol-%, more preferably in the range of 30 to 40 mol-%, yet more preferably in the range of 32 to 38 mol-%. The comonomers present in the xylene cold soluble (XCS) fraction are those defined above for the random propylene copolymer (R-PP) and the elastomeric propylene copolymer (E), respectively. In one preferred embodiment the comonomer is ethylene only.

The heterophasic propylene copolymer (RAHECO) can be further defined by its individual components, i.e. the random propylene copolymer (R-PP) and the elastomeric propylene copolymer (E).

The random propylene copolymer (R-PP) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

The random propylene copolymer (R-PP) according to this invention has a melt flow rate $MFR_2$ (230° C./2.16 kg) before visbreaking measured according to ISO 1133 in the range of 0.1 to 10.0 g/10 min, more preferably in the range of 1.0 to 4.5 g/10 min, still more preferably in the range of 1.3 to 1.9 g/10 min.

As mentioned above the heterophasic propylene copolymer (RAHECO) is featured by a moderate comonomer content. Accordingly, the comonomer content of the random propylene copolymer (R-PP) is in the range of 2.0 to 15.0 mol-%, yet more preferably in the range of 3.8 to 12.0 mol-%, still more preferably in the range of 6.5 to 10.0 mol-%.

The term "random" indicates that the comonomers of the random propylene copolymer (R-PP) are randomly distributed within the propylene copolymer. The term random is understood according to IUPAC (Glossary of basic terms in polymer science; IUPAC recommendations 1996).

The random propylene copolymer (R-PP) preferably comprises at least two polymer fractions, like two or three polymer fractions, all of them are propylene copolymers.

Even more preferred the random propylene copolymer (R-PP) comprises, preferably consists of, a first propylene copolymer fraction (R-PP1) and a second propylene copolymer fraction (R-PP2).

Concerning the comonomers used for the first propylene copolymer fraction (R-PP1) and second propylene copolymer fraction (R-PP2) reference is made to the comonomers of the random propylene copolymer (R-PP). Preferably the first propylene copolymer fraction (R-PP1) and the second propylene copolymer fraction (R-PP2) contain the same comonomers, like ethylene.

The heterophasic propylene copolymer (RAHECO) preferably comprises 60 to 95 wt.-%, more preferably 60 to 90 wt.-%, still more preferably 65 to 87 wt.-% of the random propylene copolymer (R-PP), based on the total weight of the heterophasic propylene copolymer (RAHECO).

Additionally, the heterophasic propylene copolymer (RAHECO) preferably comprises 5 to 40 wt.-%, more preferably 10 to 40 wt.-%, still more preferably 13 to 35 wt.-% of the elastomeric propylene copolymer (E), based on the total weight of the heterophasic propylene copolymer (RAHECO).

Thus, it is appreciated that the heterophasic propylene copolymer (RAHECO) preferably comprises, more preferably consists of, 60 to 95 wt.-%, preferably 60 to 90 wt.-%, more preferably 65.0 to 87.0 wt.-% of the random propylene copolymer (R-PP) and 5 to 40 wt.-%, preferably 10 to 40 wt.-%, more preferably 13.0 to 35.0 wt.-% of the elastomeric propylene copolymer (E), based on the total weight of the heterophasic propylene copolymer (RAHECO).

Accordingly, a further component of the heterophasic propylene copolymer (RAHECO) is the elastomeric propylene copolymer (E) dispersed in the matrix (M). Concerning the comonomers used in the elastomeric propylene copolymer (E) it is referred to the information provided for the heterophasic propylene copolymer (RAHECO). Accordingly, the elastomeric propylene copolymer (E) comprises monomers copolymerizable with propylene, for example comonomers such as ethylene and/or $C_4$ to $C_8$ α-olefins, in particular ethylene and/or $C_4$ to $C_6$ α-olefins, e.g. 1-butene and/or 1-hexene. Preferably, the elastomeric propylene copolymer (E) comprises, especially consists of, monomers copolymerizable with propylene from the group consisting of ethylene, 1-butene and 1-hexene. More specifically, the elastomeric propylene copolymer (E) comprises—apart from propylene—units derivable from ethylene and/or 1-butene. Thus, in an especially preferred embodiment the elastomeric propylene copolymer (E) comprises units derivable from ethylene and propylene only.

The comonomer content of the elastomeric propylene copolymer (E) preferably is in the range of 30.0 to 65.0 mol.-%, more preferably in the range of 40.0 to 55.0 mol.-%, still more preferably in the range of 48.0 to 51.0 mol.-%.

As indicated above, the random propylene copolymer (R-PP) preferably comprises at least two polymer fractions, like two or three polymer fractions, all of them are propylene copolymers. Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

Preferably, the comonomer contents of the random propylene copolymer (R-PP) and the first propylene copolymer fraction (R-PP1) fulfil inequation (II), more preferably inequation (IIa), still more preferably inequation (IIb), $$\frac{Co(RPP)}{Co(RPP1)} \geq 1.4, \tag{II}$$

$$\frac{Co(RPP)}{Co(RPP1)} \geq 2.5, \tag{IIa}$$

$$\frac{Co(RPP)}{Co(RPP1)} \geq 2.9, \tag{IIb}$$

wherein Co(RPP) is the comonomer content [mol.-%] of the random propylene copolymer (R-PP) and Co(RPP1) is the comonomer content [mol.-%] of the first propylene copolymer fraction (R-PP1).

Preferably, the first propylene copolymer fraction (R-PP1) and the second propylene copolymer fraction (R-PP2) differ in the comonomer content.

Preferably one of the propylene copolymer fractions (R-PP1) and (R-PP2) of the random propylene copolymer (R-PP) is the comonomer lean fraction and the other fraction is the comonomer rich fraction, wherein further the lean fraction and the rich fraction fulfil inequation (III), more preferably inequation (IIIa), still more preferably inequation (IIIb), $$\frac{Co(\text{lean})}{Co(\text{rich})} \leq 0.50, \tag{III}$$

$$0.11 \leq \frac{Co(\text{lean})}{Co(\text{rich})} \leq 0.32, \tag{IIIa}$$

$$0.25 \leq \frac{Co(\text{lean})}{Co(\text{rich})} \leq 0.21, \tag{IIIb}$$

wherein Co (lean) is the comonomer content [mol.-%] of the random propylene copolymer fraction with the lower comonomer content and Co (rich) is the comonomer content [mol.-%] of the random propylene copolymer fraction with the higher comonomer content.

Preferably, the first propylene copolymer fraction (R-PP1) is the random copolymer fraction with the lower comonomer content and the second propylene copolymer fraction (R-PP2) is the random copolymer fraction with the higher comonomer content.

Accordingly, it is preferred that the first propylene copolymer fraction (R-PP1) has a comonomer content in the range of 0.8 to 6.0 mol.-%, more preferably in the range of 1.5 to 4.0 mol.-%, still more preferably in the range of 2.2 to 3.0 mol.-% and/or that the second propylene copolymer fraction has a comonomer content in the range of 7.2 to 20.0 mol.-%, more preferably in the range of 10.5 to 17.5 mol.-%, still more preferably in the range of 12.0 to 15.5 mol.-%, based on the overall fractions (R-PP1) and (R-PP2), respectively.

In addition or alternatively to inequation (III) one of the propylene copolymer fractions (R-PP1) and (R-PP2) of the random propylene copolymer (R-PP) is the low melt flow rate $MFR_2$ (230° C./2.16 kg) fraction and the other fraction is the high melt flow rate $MFR_2$ (230° C./2.16 kg) fraction, wherein further the low flow fraction and the high flow fraction fulfil inequation (IV), more preferably inequation (IVa), still more preferably inequation (IVb), $$\frac{MFR(\text{high})}{MFR(\text{low})} \geq 2.0, \tag{IV}$$

-continued $$8.0 \geq \frac{MFR(high)}{MFR(low)} \geq 2.5, \quad \text{(IVa)}$$

$$5.0 \geq \frac{MFR(high)}{MFR(low)} \geq 3.5, \quad \text{(IVb)}$$

wherein MFR (high) is the melt flow rate $MFR_2$ (230° C./2.16 kg) [g/10 min] before visbreaking of the random propylene copolymer fraction with the higher melt flow rate $MFR_2$ (230° C./2.16 kg) and MFR (low) is the melt flow rate $MFR_2$ (230° C./2.16 kg) [g/10 min] before visbreaking of the random propylene copolymer fraction with the lower melt flow rate $MFR_2$ (230° C./2.16 kg).

Preferably, the first propylene copolymer fraction (R-PP1) is the random copolymer fraction with the higher melt flow rate $MFR_2$ (230° C./2.16 kg) and the second propylene copolymer fraction (R-PP2) is the random copolymer fraction with the lower melt flow rate $MFR_2$ (230° C./2.16 kg).

Accordingly, it is preferred that the first propylene copolymer fraction (R-PP1) has a melt flow rate $MFR_2$ (230° C./2.16 kg) before visbreaking in the range of 3.5 to 10.0 g/10 min, more preferably in the range of 4.8 to 8.0 g/10 min, still more preferably in the range of 5.0 to 7.0 g/10 min and/or that the second propylene copolymer fraction (R-PP2) has a melt flow rate $MFR_2$ (230° C./2.16 kg) before visbreaking in the range of 0.1 to 4.0 g/10 min, more preferably in the range of 1.0 to 2.5 g/10 min, still more preferably in the range of 1.3 to 1.7 g/10 min.

The heterophasic propylene copolymer (RAHECO) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

Further, the weight ratio between the first propylene copolymer fraction (R-PP1) and second propylene copolymer fraction (R-PP2) preferably is 10:90 to 90:10, more preferably 15:85 to 85:15, still more preferably 20:80 to 80:20.

In one embodiment of the present invention, the heterophasic propylene copolymer (RAHECO) has been visbroken.

The visbroken heterophasic propylene copolymer (RAHECO) preferably has a higher melt flow rate than the non-visbroken heterophasic propylene copolymer (RAHECO).

Accordingly, the heterophasic propylene copolymer (RAHECO) before visbreaking preferably has a melt flow rate $MFR_2$ (230° C.) in the range of 0.5 to 2.5 g/10 min. For example, the melt flow rate (230° C./2.16 kg) of the heterophasic propylene copolymer (RAHECO) before visbreaking is from 0.8 to 2.3 g/10 min, like from 1.0 to 1.8 g/10 min.

In one embodiment of the present invention, the heterophasic propylene copolymer (RAHECO) has been visbroken with a visbreaking ratio (VR) as defined by equation (V)

$$1.1 \leq \frac{MFRfinal - MFRinitial}{MFRinitial} \leq 10.0 \quad \text{(V)}$$

wherein

"MFRfinal" is the $MFR_2$ (230° C./2.16 kg) of the heterophasic propylene copolymer (RAHECO) after visbreaking and "MFRinitial" is the $MFR_2$ (230° C./2.16 kg) of the heterophasic propylene copolymer (RAHECO) before visbreaking.

Preferred mixing devices suited for visbreaking are discontinuous and continuous kneaders, twin screw extruders and single screw extruders with special mixing sections and co-kneaders.

By visbreaking the heterophasic propylene copolymer (RAHECO) with heat or at more controlled conditions with peroxides, the molar mass distribution (MWD) becomes narrower because the long molecular chains are more easily broken up or scissored and the molar mass M, will decrease, corresponding to an $MFR_2$ increase. The $MFR_2$ increases with increase in the amount of peroxide which is used.

Such visbreaking may be carried out in any known manner, like by using a peroxide visbreaking agent. Typical visbreaking agents are 2,5-dimethyl-2,5-bis(tert.-butyl-peroxy)hexane (DHBP) (for instance sold under the tradenames Luperox 101 and Trigonox 101), 2,5-dimethyl-2,5-bis(tert.-butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.-butyl-peroxide (DTBP) (for instance sold under the tradenames Trigonox B and Luperox Di), tert.-butyl-cumyl-peroxide (BCUP) (for instance sold under the tradenames Trigonox T and Luperox 801) and bis (tert.-butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of heterophasic propylene copolymer (RAHECO) to be subjected to visbreaking, the $MFR_2$ (230° C./2.16 kg) value of the heterophasic propylene copolymer (RAHECO) to be subjected to visbreaking and the desired target $MFR_2$ (230° C./2.16 kg) of the product to be obtained. Accordingly, typical amounts of peroxide visbreaking agent are from 0.005 to 0.7 wt.-%, more preferably from 0.01 to 0.4 wt.-%, based on the total amount of heterophasic propylene copolymer (RAHECO) employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The inventive heterophasic propylene copolymer (RAHECO) is preferably obtained by visbreaking the heterophasic propylene copolymer (RAHECO), preferably visbreaking by the use of peroxide.

More precisely, the inventive heterophasic propylene copolymer (RAHECO) may be obtained by visbreaking the heterophasic propylene copolymer (RAHECO), preferably by the use of peroxide as mentioned above, in an extruder.

After visbreaking the heterophasic propylene copolymer (RAHECO) according to this invention is preferably in the form of pellets or granules. The instant heterophasic propylene copolymer (RAHECO) is preferably used in pellet or granule form for the preparation of the film.

The heterophasic propylene copolymer (RAHECO) is preferably produced in a multistage process comprising at least two reactors connected in series a heterophasic propylene copolymer (RAHECO) comprising a matrix (M)

being a random propylene copolymer (PP) and an elastomeric propylene copolymer (E) dispersed in said matrix (M).

Preferably the heterophasic propylene copolymer (RAHECO) is obtained by a sequential polymerization process comprising the steps of
a) polymerizing in a first reactor (R1) propylene and ethylene and/or a $C_4$ to $C_8$ α-olefin, obtaining a first random propylene copolymer fraction (R-PP1),
b) transferring the first random propylene copolymer fraction (R-PP1) into a second reactor (R2),
c) polymerizing in said second reactor (R2) in the presence of the first random propylene copolymer fraction (R-PP1) propylene and ethylene and/or a $C_4$ to $C_8$ α-olefin, obtaining a second random copolymer fraction (R-PP2), said first random propylene copolymer fraction (R-PP1) and said second random copolymer fraction (R-PP2) forming the random propylene copolymer (R-PP),
d) transferring said random propylene copolymer (R-PP) into a third reactor (R3),
e) polymerizing in said third reactor (R3) in the presence of the random propylene copolymer (R-PP) propylene and/or a $C_4$ to $C_8$ α-olefin, obtaining a third polymer fraction, said polymer fraction is the elastomeric copolymer (E), said propylene copolymer (R-PP) and said elastomeric propylene copolymer (E) form the heterophasic propylene copolymer (RAHECO), For preferred embodiments of the random heterophasic propylene copolymer (RAHECO), the random propylene copolymer (R-PP), the first propylene copolymer fraction (R-PP1), the second propylene copolymer fraction (R-PP2) and the elastomeric copolymer (E), reference is made to the definitions given above.

The term "sequential polymerization process" indicates that the random heterophasic propylene copolymer (RAHECO) is produced in at least two, like three, reactors connected in series. Accordingly, the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor (R3) are gas phase reactors (GPR). Accordingly, for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) as defined above the conditions for the first reactor, i.e. the slurry reactor, like a loop reactor, may be as follows:
the temperature is within the range of 50° C. to 110° C., preferably between 60° C. and 100° C., more preferably between 65 and 95° C.,
the pressure is within the range of 20 bar to 80 bar, preferably between 40 bar to 70 bar,
hydrogen can be added for controlling the molar mass in a manner known per se.

Subsequently, the reaction mixture of the first reactor is transferred to the second reactor, i.e. gas phase reactor, where the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor is similar to the second reactor.

The residence time can vary in the three reactor zones.

In one embodiment of the process for producing the heterophasic propylene copolymer (RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 18 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) is obtained by a multistage polymerization process, as described above, in the presence of a catalyst system.

As pointed out above in the specific process for the preparation of the heterophasic propylene copolymer (RAHECO) as defined above, a specific Ziegler-Natta catalyst (ZN-C) must be used. Accordingly, the Ziegler-Natta catalyst (ZN-C) will be now described in more detail.

The heterophasic propylene copolymer (RAHECO) applied according to this invention is preferably produced in the presence of
(a) a Ziegler-Natta catalyst (ZN-C) comprising compounds (TC) of a transition metal of Group 4 to 6 of IUPAC, a Group 2 metal compound (MC) and an internal donor (ID);
(b) optionally a co-catalyst (Co), and
(c) optionally an external donor (ED).

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C) can be further defined by the way as obtained. Accordingly, the Ziegler-Natta catalyst (ZN-C) is preferably obtained by a process comprising the steps of
a)
   $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
   or
   $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
   or
   $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and
b) adding said solution from step a) to at least one compound (TC) of a transition metal of Group 4 to 6 and
c) obtaining the solid catalyst component particles,
   and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R"(OH)$_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m$^2$, more preferably below 10 g/m$^2$. Typically, the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

The catalyst system which is used according to the present invention also comprises an aluminium alkyl compound, preferably of the general formula $AlR_{3-n}X_n$ wherein R stands for straight chain or branched alkyl group having 1 to 20, preferably 1 to 10 and more preferably 1 to 6 carbon atoms, X stands for halogen and n stands for 0, 1, 2 or 3, which aluminium alkyl compound is added, and brought into contact with the droplets of the dispersed phase of the agitated emulsion before recovering the solidified particles of the catalyst.

It is further preferred that at least a part of the aluminium compound is added, in pure form or in the form of a solution, from shortly before the beginning of the emulsion formation until adding it to the washing liquid, e.g. toluene, in such an amount that the final Al content of the particles is from 0.05 to 1 wt.-%, preferably 0.1 to 0.8 wt.-% and most preferably 0.2 to 0.7 wt.-%. by weight of the final catalyst particles. The most preferred Al content may vary depending upon the type of the Al compound and on the adding step. For example, in some cases the most preferred amount may be 0.1 to 0.4 wt.-%.

Still further, preferably tri-($C_1$-$C_6$)-alkyl aluminium compounds are used, triethylaluminium being most preferred.

In Ziegler-Natta catalysts aluminum alkyl compounds are used as cocatalysts, i.e. for activating the catalyst. During activation of polypropylene catalysts, alkyl aluminium does not only reduce and alkylate the active metal, but it has also influence on the donor composition. It is well-known that alkyl aluminium compounds can remove carboxylic acid esters, which are used as internal donors. Simultaneously, external donors can be fixed on the catalyst. Typically, tri-ethyl aluminium (TEAl) is used as cocatalyst and silanes as external donors as is disclosed e.g. in articles Sacci, M. C; Forlini, F.; Tritto, I and Locatelli, P., Macromolecules, 1996, 29, 3341-3345 and Sacci, M. C; Tritto, I.; Shan, C. and Mendichi, R., Macromolecules, 1991, 24, 6823-6826.

In the catalysts used in the present invention, the internal donor, preferably substituted maleates and citraconates, can be significantly extracted from the catalyst with the use of the alkyl aluminium compound.

The extraction level is dependent on the concentration of the aluminium alkyl. The higher the concentration, the more of the internal donor can be extracted. Further, the addition of the external donor together with aluminium alkyl improves the donor exchange. The longer the reaction time is, the more external donor is bound on the catalyst.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula

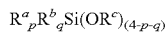

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the cyclohexylmethyl dimethoxy silane donor (C-Donor) or the pentyl dimethoxy silane donor (D-donor), the latter especially preferred.

It is preferred that a solution containing alkyl aluminium and external donor in an organic solvent, e.g. pentane, are added to the catalyst after solidification of the catalyst particles.

The catalyst which is obtained by the above described process is a nonsupported Ziegler-Natta catalyst. Non-supported catalysts do not use any external carrier, contrary to conventional catalysts, e.g. conventional Ziegler-Natta catalysts, which are e.g. supported on silica or MgCl$_2$.

Further preferred embodiments of the catalyst system production include all preferred embodiments as described in WO 2014/187686 A1 and WO 2016/066446 A1.

The Propylene Homopolymer (H-PP)

The inventive polypropylene composition (C) further comprises a propylene homopolymer (H-PP).

The expression "propylene homopolymer" used in the instant invention relates to a polypropylene that consists substantially, i.e. of more than 99.70 mol-%, still more preferably of at least 99.80 mol-%, of propylene units. In a preferred embodiment only propylene units in the propylene homopolymer are detectable.

Accordingly, it is preferred that the propylene homopolymer (H-PP) has a xylene soluble content (XCS) below 5.0 wt.-%, more preferably below 4.0 wt.-%, still more preferably below 3.5 wt.-%.

It is preferred that the propylene homopolymer (H-PP) is featured by a high isotacticity. Accordingly, it is preferred that the propylene homopolymer (H-PP) has a mmmm pentad concentration of ≥85.0%, preferably in the range of from 85.0 to 98.0% determined by NMR-spectroscopy, and/or 2,1 erythro regio-defects of below 1.0%, preferably below 0.5%, more preferably below 0.3% determined by $^{13}$C-NMR spectroscopy.

It is especially preferred that the propylene homopolymer (H-PP) has a weight average molecular weight Mw in the range of 260 to 1000 kg/mol, preferably in the range of 300 to 700 kg/mol, still more preferably in the range of 380 to 650 kg/mol.

Further it is preferred that the propylene homopolymer (H-PP) has a rather broad molecular weight distribution (Mw/Mn). Accordingly, it is preferred that the molecular weight distribution (Mw/Mn) of the propylene homopolymer (H-PP) is in the range of 3.5 to 10.0, more preferably in the range of 4.0 to 8.5, like in the range of 4.5 to 7.5.

Additionally, it is preferred that the propylene homopolymer (H-PP) has a very low melt flow rate. Accordingly, the melt flow rate (230° C.) measured according to ISO 1133 of the propylene homopolymer (H-PP) is preferably in the range of 0.1 to 15.0 g/10 min, more preferably in the range of 1.5 to 10.0 g/10 min, still more preferably in the range of 2.5 to 4.0 g/10 min.

In a preferred embodiment, the propylene homopolymer (H-PP) is thermo mechanically stable. Accordingly, it is preferred that the propylene homopolymer (H-PP) has a melting temperature Tm of at least 145° C., more preferably at least 150° C., still more preferably at least 160° C. A reasonable upper limit for Tm is 170° C.

Preferably, the propylene homopolymer (H-PP) according to the present invention is a propylene homopolymer known in the art. In particular, it is preferred that the propylene homopolymer (H-PP) is the commercial propylene homopolymer HC101BF of Borealis AG.

The Additives

The polypropylene composition (C) of the present invention may include additives (AD). Typical additives are acid scavengers, antioxidants, colorants, light stabilisers, plasticizers, slip agents, anti-scratch agents, dispersing agents, processing aids, lubricants, pigments, fillers, and the like.

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polypropylene composition (C) of the invention does not comprise (a) further polymer (s) different to the heterophasic propylene copolymer (RAHECO) and the plastomer (PL), in an amount exceeding 15 wt.-%, preferably in an amount exceeding 10 wt.-%, more preferably in an amount exceeding 9 wt.-%, based on the weight of the polpropylene composition (C). If an additional polymer is present, such a polymer is typically a polymeric carrier material for the additives (AD). Any carrier material for additives (AD) is not calculated to the amount of polymeric compounds as indicated in the present invention, but to the amount of the respective additive.

The polymeric carrier material of the additives (AD) is a carrier polymer to ensure a uniform distribution in the composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The present invention is not only directed to the inventive polypropylene composition (C), but also to unoriented films made therefrom. Accordingly, in a further embodiment the present invention is directed to unoriented films, like cast films or blown films, e.g. air cooled blown films, comprising at least 70.0 wt.-%, preferably comprising at least 80.0 wt.-%, more preferably comprising at least 90.0 wt.-%, still more preferably comprising at least 95.0 wt.-%, yet more preferably comprising at least 99.0 wt.-%, of the inventive polypropylene composition (C). Preferably, the unoriented film consists of the inventive polypropylene composition (C).

One distinguishes between unoriented and oriented films (see for instance polypropylene handbook, Nello Pasquini, $2^{nd}$ edition, Hanser). Oriented films are typically monoaxially or biaxially oriented films, whereas unoriented films are cast or blown films. Accordingly, an unoriented film is not drawn intensively in machine and/or transverse direction as done by oriented films. Thus the unoriented film according to this invention is not a monoaxially or biaxially oriented film. Preferably the unoriented film according to the instant invention is a blown film or cast film.

In one specific embodiment the unoriented film is a cast film or an air-cooled blown film.

Preferably the unoriented film has a thickness of 10 to 1000 μm, more preferably of 20 to 700 μm, like of 40 to 500 μm.

In the following the present invention is further illustrated by means of examples.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2) \quad \text{(I)}$$

wherein w(PP1) is the weight fraction [in wt.-%] of the first propylene copolymer fraction (R-PP1), w(PP2) is the weight fraction [in wt.-%] of second propylene copolymer fraction (R-PP2), C(PP1) is the comonomer content [in mol-%] of the first propylene copolymer fraction (R-PP1), C(PP) is the comonomer content [in mol-%] of the random propylene copolymer (R-PP), C(PP2) is the calculated comonomer content [in mol-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad \text{(II)}$$

wherein w(PP1) is the weight fraction [in wt.-%] of the first propylene copolymer fraction (R-PP1), w(PP2) is the weight fraction [in wt.-%] of second propylene copolymer fraction (R-PP2), XS(PP1) is the xylene cold soluble (XCS) content [in wt.-%] of the first propylene copolymer fraction (R-PP1), XS(PP) is the xylene cold soluble (XCS) content [in wt.-%] of the random propylene copolymer (R-PP), XS(PP2) is the calculated xylene cold soluble (XCS) content [in wt.-%] of the second propylene copolymer fraction (R-PP2), respectively.

Calculation of melt flow rate $MFR_2$ (230° C.) of the second propylene copolymer fraction (R-PP2):

$$MFR(PP2) = 10^{\left[\frac{\log(MFR(PP)) - w(PP1) \times \log(MFR(PP1))}{w(PP2)}\right]} \quad \text{(III)}$$

wherein w(PP1) is the weight fraction [in wt.-%] of the first propylene copolymer fraction (R-PP1), w(PP2) is the weight fraction [in wt.-%] of second propylene copolymer fraction (R-PP2), MFR(PP1) is the melt flow rate $MFR_2$ (230° C.) [in g/10 min] of the first propylene copolymer fraction (R-PP1), MFR(PP) is the melt flow rate $MFR_2$ (230° C.) [in g/10 min] of the random propylene copolymer (R-PP), MFR(PP2) is the calculated melt flow rate $MFR_2$ (230° C.) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad \text{(IV)}$$

wherein w(PP) is the weight fraction [in wt.-%] of the random propylene copolymer (R-PP), i.e. polymer produced in the first and second reactor (R1+R2), w(E) is the weight fraction [in wt.-%] of the elastomeric propylene copolymer (E), i.e. polymer produced in the third reactor (R3)

C(PP) is the comonomer content [in mol-%] of the random propylene copolymer (R-PP), i.e. comonomer content [in mol-%] of the polymer produced in the first and second reactor (R1+R2), C(RAHECO) is the comonomer content [in mol-%] of the propylene copolymer, i.e. is the comonomer content [in mol-%] of the polymer obtained after polymerization in the third reactor (R3), C(E) is the calculated comonomer content [in mol-%] of elastomeric propylene copolymer (E), i.e. of the polymer produced in the third (R3).

$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C$ {$^{1}H$} NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C$ $\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W.-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromoleucles 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

[21e] mol %=100*($P_{21e}/P_{total}$)

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W.-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W.-J., Zhu, S., Macromolecules 33 (2000), 1157) through integration of multiple signals across the whole spectral region in the $^{13}C$ $\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E=0.5(S\beta\beta+S\beta\gamma+S\beta\delta+0.5(S\alpha\beta+S\alpha\gamma))$

Through the use of this set of sites the corresponding integral equation becomes:

$E=0.5(I_H+I_G+0.5(I_C+I_D))$ using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

E[mol %]=100*fE

The weight percent comonomer incorporation was calculated from the mole fraction:

E[wt %]=100*(fE*28.06)/((fE*28.06)+((1−fE)*42.08))

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Number Average Molecular Weight ($M_n$), Weight Average Molecular Weight ($M_w$) and Molecular Weight Distribution (MWD)

Molecular weight averages (Mw, Mn), and the molecular weight distribution (MWD), i.e. the Mw/Mn (wherein Mn is the number average molecular weight and Mw is the weight average molecular weight), were determined by Gel Permeation Chromatography (GPC) according to ISO 16014-4:2003 and ASTM D 6474-99. A PolymerChar GPC instrument, equipped with infrared (IR) detector was used with 3×Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min 200 μℓ. of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005-07-01. The part which remains insoluble is the xylene cold insoluble (XCI) fraction.

The hexane extractable fraction is determined according to the European Pharmacopeia 6.0 EP613. Test bar specimens of 80×10×4 mm$^3$ injection molded at 23° C. in line with EN ISO 1873-2 were used in an amount of 10 g, and the extraction was performed in 100 ml n-hexane by boiling under reflux for 4 h, followed by cooling in ice water for 45 min. The resulting solution is filtered under vacuum in less than 5 min, followed by evaporation under nitrogen stream. After drying the evaporation residue it is weighed and the hexane extractable fraction calculated.

DSC analysis, melting temperature ($T_m$), crystallization temperature ($T_c$) and melt enthalpy (Hm): measured with a TA Instrument Q200 differential scanning calorimetry (DSC) on 5 to 7 mg samples. DSC is run according to ISO 11357/part 3/method C$_2$ in a heat/cool/heat cycle with a scan rate of 10° C./min in the temperature range of −30 to +225° C. The crystallization temperature (TO is determined from the cooling step, while melting temperature ($T_m$) and melting enthalpy ($H_m$) are determined from the second heating step.

Haze and clarity were determined according to ASTM D1003-00 on cast films of 100 μm thickness produced on a monolayer cast film line with a melt temperature of 220° C. and a chill roll temperature of 20° C.

Flexural Modulus: The flexural modulus was determined in 3-point-bending according to ISO 178 on 80×10×4 mm$^3$ test bars injection molded at 23° C. in line with EN ISO 1873-2.

The Tensile Modulus and Elongation at Break in machine and transverse direction were determined according to ISO 527-3 at 23° C. on cast films of 1000 μm thickness produced on a monolayer cast film line with a melt temperature of 220° C. and a chill roll temperature of 20° C. Testing was performed at a cross head speed of 1 mm/min.

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature till processed further.

2. Examples

Preparation of the Catalyst
The catalyst used in the polymerization processes for the heterophasic propylene copolymer (RAHECO) of the inventive examples (IE) was prepared as follows:
Used Chemicals:
20% solution in toluene of butyl ethyl magnesium (Mg (Bu)(Et), BEM), provided by Chemtura
2-ethylhexanol, provided by Amphochem
3-Butoxy-2-propanol—(DOWANOL™ PnB), provided by Dow
bis(2-ethylhexyl)citraconate, provided by SynphaBase
TiCl$_4$, provided by Millenium Chemicals
Toluene, provided by Aspokem
Viscoplex® 1-254, provided by Evonik
Heptane, provided by Chevron
Preparation of a Mg Alkoxy Compound
Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component
20.3 kg of TiCl$_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and dicyclopentyl dimethoxy silane (D-Donor) as donor.

TABLE 1

Preparation of RAHECO

|  |  | RAHECO |
|---|---|---|
| Prepolymerization |  |  |
| TEAL/Ti | [mol/mol] | 201 |
| TEAL/donor | [mol/mol] | 7.90 |
| Temperature | [° C.] | 30 |
| res.time | [h] | 0.33 |
| Loop |  |  |
| Temperature | [° C.] | 70 |
| Pressure | [kPa] | 5500 |
| Split | [%] | 30.8 |
| H2/C3 ratio | [mol/kmol] | 1.15 |
| C2/C3 ratio | [mol/kmol] | 3.77 |

TABLE 1-continued

Preparation of RAHECO

|  |  | RAHECO |
|---|---|---|
| $MFR_2$ | [g/10 min] | 6.0 |
| XCS | [wt.-%] | 5.3 |
| C2 content | [mol-%] | 3.0 |
| GPR 1 | | |
| Temperature | [° C.] | 80 |
| Pressure | [kPa] | 2700 |
| Split | [%] | 46.2 |
| H2/C3 ratio | [mol/kmol] | 2.6 |
| C2/C3 ratio | [mol/kmol] | 46.7 |
| $MFR_2$ | [g/10 min] | 2.2 |
| XCS | [wt.-%] | 17.9 |
| C2 content | [mol-%] | 8.7 |
| GPR 2 | | |
| Temperature | [° C.] | 71 |
| Pressure | [kPa] | 2600 |
| Split | [%] | 23.0 |
| C2/C3 ratio | [mol/kmol] | 252 |
| H2/C2 ratio | [mol/kmol] | 84 |
| $MFR_2$ | [g/10 min] | 1.2 |
| XCS | [wt.-%] | 39.0 |
| IV (XCS) | [dl/g] | 2.2 |
| C2 (XCS) | [mol-%] | 34.5 |
| C2 content | [mol-%] | 20.9 |

C2 ethylene
H2/C3 ratio hydrogen/propylene ratio
C2/C3 ratio ethylene/propylene ratio
H2/C2 ratio hydrogen/ethylene ratio
GPR 1/2 1st/2nd gas phase reactor
Loop Loop reactor The RAHECO was visbroken in a twin-screw extruder using an appropriate amount of (tert.-butylperoxy)-2,5-dimethylhexane (Trigonox 101, distributed by Akzo Nobel, Netherlands) to achieve the target $MFR_2$ as mentioned in table 2. The product was stabilized with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.1 wt.-% calcium stearate.

Preparation of the Composition (C)

The RAHECO (CE1) and the propylene homopolymer HC101BF by Borealis (H-PP, CE3) were melt blended on a co-rotating twin screw extruder at 220° C. The polymer melt mixture was discharged and pelletized.

TABLE 2

Properties of comparative and inventive examples

|  |  | CE1 | CE2 | IE4 | IE3 | IE2 | IE1 | CE3 |
|---|---|---|---|---|---|---|---|---|
| RAHECO | [wt.-%] | 100 | 90 | 80 | 70 | 60 | 40 | 0 |
| H-PP | [wt.-%] | 0 | 10 | 20 | 30 | 40 | 60 | 100 |
| MFR | [g/10 min] | 3.80 | 3.74 | 3.67 | 3.61 | 3.55 | 3.43 | 3.20 |
| XCS | [wt.-%] | 39.4 | 34.3 | 30.2 | 26.7 | 22.2 | 15.2 | 3.0 |
| C2 content | [mol-%] | 20.9 | 18.9 | 16.9 | 14.9 | 12.9 | 8.7 | 0 |
| IV (XCS) | [dl/g] | 2.20 | 2.18 | 2.15 | 2.10 | 2.05 | 2.00 | nd |
| C2 (XCS) | [mol-%] | 34.5 | 33.9 | 33.3 | 32.7 | 32.5 | 32.1 | 0 |
| IV (XCI) | [dl/g] | 3.01 | 2.98 | 2.96 | 2.95 | 2.93 | 2.89 | 2.83 |
| C2 (XCI) | [mol-%] | 7.9 | 7.2 | 6.3 | 5.6 | 4.7 | 3.3 | 0 |
| Tm | [° C.] | 149 | 153 | 156 | 158 | 159 | 161 | 161 |
| Tc | [° C.] | 116 | 118 | 120 | 121 | 122 | 123 | 115 |
| Hm | [J/g] | 52.9 | 57.5 | 63.6 | 69.5 | 73.8 | 85.4 | 104.0 |
| C6 (pham) | [wt.-%] | 20.2 | 16.3 | 10.9 | 7.8 | 5.9 | 3.4 | 0.8 |
| Haze b.s. | [%] | 3.6 | 4.2 | 5.2 | 6.2 | 6.9 | 15.9 | 31.4 |
| Haze a.s | [%] | 8.4 | 7.1 | 6.8 | 6.5 | 6.4 | 9.4 | 23.0 |
| Clarity b.s | [%] | 96.0 | 96.0 | 95.2 | 96.2 | 96.8 | 95.4 | 89.0 |
| Clarity a.s. | [%] | 92.3 | 94.0 | 94.0 | 95.0 | 96.0 | 96.0 | 92.5 |
| Flex. Modulus | [MPa] | 338 | 628 | 712 | 794 | 867 | 1033 | 1350 |
| Tensile Modulus/MD | [MPa] | 217 | 267 | 314 | 346 | 423 | 556 | 884 |
| Tensile Modulus/TD | [MPa] | 163 | 205 | 273 | 301 | 367 | 501 | 891 |
| Elongation at break/MD | [%] | 781 | 903 | 931 | 848 | 693 | 680 | 664 |
| Elongation at break/TD | [%] | 761 | 901 | 896 | 868 | 834 | 709 | 719 |

H-PP is the commercial propylene homopolymer HC101BF by Borealis.

The invention claimed is:

1. A polypropylene composition (C), comprising:
   a) a matrix (M) comprising a random propylene copolymer (R-PP) and a propylene homopolymer (H-PP) and
   b) an elastomeric propylene copolymer (E) dispersed in said matrix (M),
   wherein said polypropylene composition (C) has:
   i) a xylene soluble content (XCS) with
      a) an intrinsic viscosity (IV) determined according to DIN ISO 1628/1 (in Decalin at 135° C.) of the xylene soluble content (XCS) of at least 1.8 dl/g, and
      b) an ethylene content of the xylene soluble content (C2 (XCS)) of at least 30.0 mol %, and
   iii) a melt flow rate $MFR_2$ (230° C.) measured according to ISO 1133 of at least 2.0 g/10 min; and
   wherein the random propylene copolymer (R-PP) and the elastomeric propylene copolymer (E) form a heterophasic propylene copolymer (RAHECO), said heterophasic propylene copolymer (RAHECO) having a xylene soluble content (XCS) in the range of 37.0 to 50.0 wt. % and a melt flow rate $MFR_2$ (230° C.) measured according to ISO 1133 in the range of 0.1 to 10.0 g/10 min.

2. The polypropylene composition (C) according to claim 1, having a melting temperature Tm above 153° C.

3. The polypropylene composition (C) according to claim 1, wherein the polypropylene composition (C) has:
   i) a xylene soluble content (XCS) in the range of 10.0 to 45.0 wt. %, and/or
   ii) an ethylene content in the range of 5.0 to 25.0 mol %, and/or
   iii) a hexane soluble content in the range of 2.0 to below 16.0 wt. %.

4. The polypropylene composition (C) according to claim 1, wherein the ratio between the hexane soluble content C6 and the xylene soluble content XCS (C6/XCS) is below 0.45.

5. The polypropylene composition (C) according to claim 1, wherein the polypropylene composition (C) has:
   i) a haze before sterilization measured according to ASTM D 1300-00 on a 100 μm thick film below 20.0% and/or
   ii) a haze after sterilization measured according to ASTM D 1300-00 on a 100 μm thick film below 12.0%.

6. The polypropylene composition (C) according to claim 1, wherein the difference between the haze after sterilization and the haze before sterilization measured according to ASTM D 1300-00 on a 100 μm thick film is below 4.0%.

7. The polypropylene composition (C) according to claim 1, comprising:
   i) 75 to 95 wt. % of the matrix (M) and
   ii) 5 to 25 wt. % of the elastomeric propylene copolymer (E),
   based on the overall weight of the polypropylene composition (C), and/or
   i) 30 to 75 wt. % of the random propylene copolymer (R-PP),
   ii) 15 to 70 wt. % of the propylene homopolymer (H-PP) and
   iii) 5 to 25 wt. % of the elastomeric propylene copolymer (E),
   based on the overall weight of the polypropylene composition (C).

8. The polypropylene composition (C) according to claim 1, wherein the comonomers of the random propylene copolymer (R-PP) and/or the comonomers of the elastomeric propylene copolymer (E) are ethylene and/or $C_4$ to $C_8$ α-olefins.

9. The polypropylene composition (C) according to claim 1, wherein said heterophasic propylene copolymer (RAHECO) having
   a) a melt flow rate $MFR_2$ (230° C.) measured according to ISO 1133 in the range of 0.1 to 10.0 g/10 min, and/or
   b) a comonomer content in the range of 5.0 to 35.0 mol % based on the amount of the heterophasic propylene copolymer (RAHECO).

10. The polypropylene composition (C) according to claim 1, wherein the heterophasic propylene copolymer (RAHECO) comprises:
    i) 60 to 90 wt. % of the random propylene copolymer (R-PP) and
    ii) 10 to 40 wt. % of the elastomeric propylene copolymer (E),
    based on the overall weight of the heterophasic propylene copolymer (RAHECO).

11. The polypropylene composition (C) according to claim 1, wherein the propylene homopolymer (H-PP) has a melt flow rate MFR (230° C.) measured according to ISO 1133 in the range of 0.1 to 15.0 g/10 min.

12. Film, comprising the polypropylene composition (C) according to claim 1.

13. A polymerization process for producing the polypropylene composition (C) according to claim 1, comprising the steps of:
    a) providing a propylene homopolymer (H-PP),
    b) polymerizing in a first reactor (R1) propylene and ethylene and/or a $C_4$ to $C_8$ α-olefin, obtaining a first random propylene copolymer fraction (R-PP1),
    c) transferring the first random propylene copolymer fraction (R-PP1) into a second reactor (R2),
    d) polymerizing in said second reactor (R2) in the presence of the first random propylene copolymer fraction (R-PP1) propylene and ethylene and/or a $C_4$ to $C_8$ α-olefin, obtaining a second random copolymer fraction (R-PP2), said first random propylene copolymer fraction (R-PP1) and said second random copolymer fraction (R-PP2) forming the random propylene copolymer (R-PP),
    e) transferring said random propylene copolymer (R-PP) into a third reactor (R3),
    f) polymerizing in said third reactor (R3) in the presence of the random propylene copolymer (R-PP) propylene and/or a $C_4$ to $C_8$ α-olefin, obtaining a third polymer fraction, said polymer fraction is the elastomeric copolymer (E), said propylene copolymer (R-PP) and said elastomeric propylene copolymer (E) form the heterophasic propylene copolymer (RAHECO),
    g) melt blending the heterophasic propylene copolymer (RAHECO) obtained in step f) with the propylene homopolymer (H-PP) of step a).

14. The process according to claim 13, wherein the first random propylene copolymer fraction (R-PP1), the random propylene copolymer (R-PP) and the elastomeric copolymer (E) have been polymerized in the presence of:
    a) a Ziegler-Natta catalyst (ZN-C) comprising compounds (TC) of a transition metal of Group 4 to 6 of IUPAC, a Group 2 metal compound (MC) and an internal donor (ID), wherein said internal donor (ID) is a non-phthalic compound;
    b) optionally a co-catalyst (Co), and
    c) optionally an external donor (ED).

* * * * *